United States Patent [19]

Bitonti

[11] 4,075,928
[45] Feb. 28, 1978

[54] SAFETY VALVE FOR FLUID SYSTEMS
[75] Inventor: Paul A. Bitonti, Troy, Mich.
[73] Assignee: Ross Operating Valve Company, Detroit, Mich.
[21] Appl. No.: 474,901
[22] Filed: May 31, 1974
[51] Int. Cl.[2] .............................................. F15B 13/04
[52] U.S. Cl. .......................................... 91/29; 91/447; 137/110
[58] Field of Search ...................... 91/28, 29, 446, 468, 91/447; 137/110, 494, 509, 510; 192/85, 109 F; 251/33

[56] References Cited
U.S. PATENT DOCUMENTS

| 1,290,865 | 1/1919 | Anthony | 137/494 X |
| 2,051,732 | 8/1936 | McKee | 137/494 X |
| 2,593,564 | 4/1952 | Ives | 251/33 X |
| 2,954,009 | 9/1960 | Juilfs | 251/25 X |
| 2,995,141 | 8/1961 | Hipp | 137/110 X |
| 3,371,759 | 3/1968 | Sapolsky | 137/494 X |
| 3,834,621 | 9/1974 | Pacht et al. | 137/110 |

Primary Examiner—Irwin C. Cohen
Attorney, Agent, or Firm—Harness, Dickey & Pierce

[57] ABSTRACT

A safety valve for use in a compressed air line having a supply valve and a control valve, to prevent inadvertent sudden shifting of the controlled part when the line is exhausted and later repressurized. The safety valve comprises a normally closed piston-operated poppet valve, the piston chamber and outlet port being connected to the supply port through a bypass with an adjustable restriction upstream of the valve member. In one embodiment, the adjustable restriction comprises a replaceable plug threaded in the valve body. In a second version, the adjustable restriction comprises a needle valve mounted in a housing cover.

5 Claims, 4 Drawing Figures

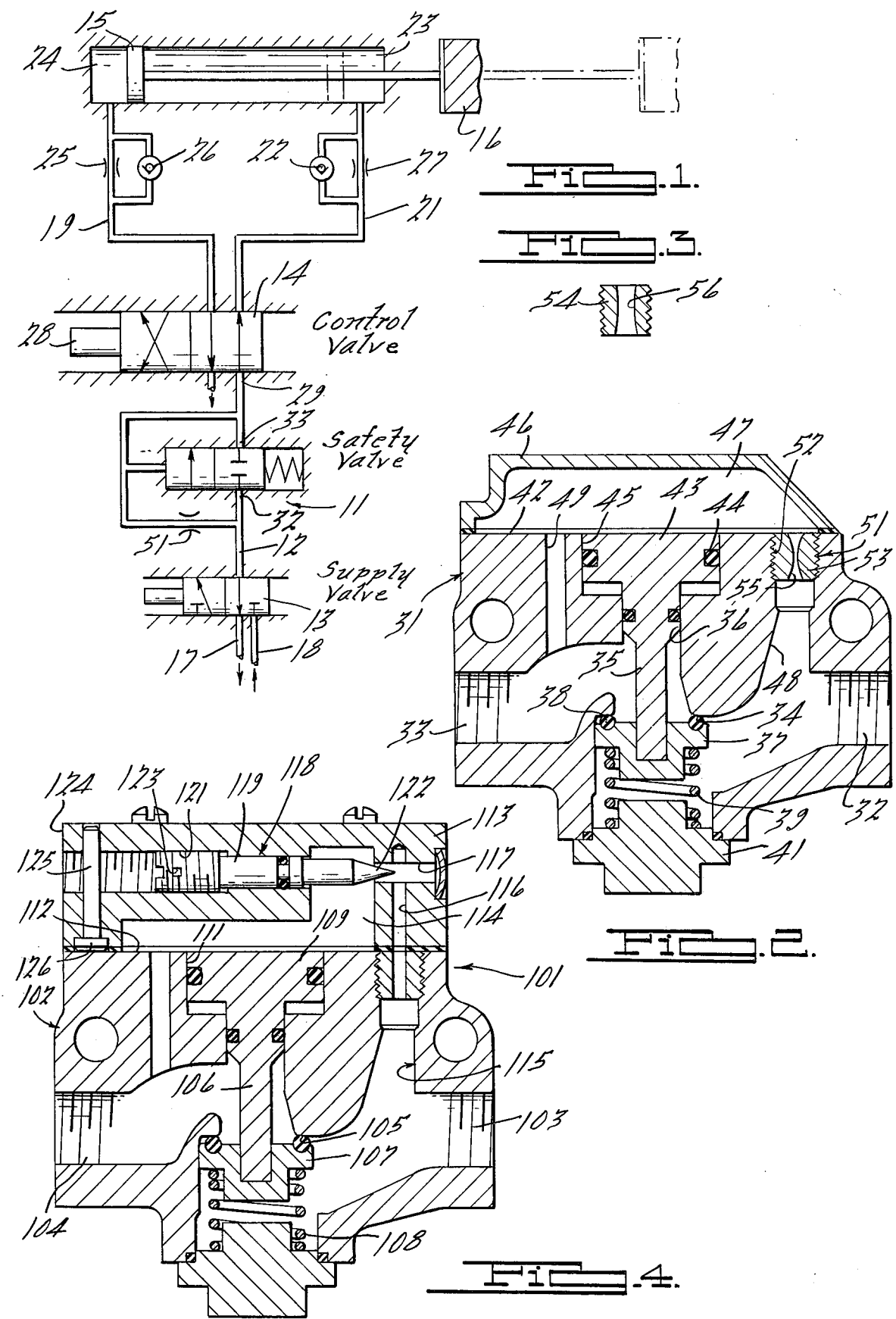

SAFETY VALVE FOR FLUID SYSTEMS

BACKGROUND OF THE INVENTION

1. Field of the Invention

The invention relates to controls for industrial compressed air systems, especially systems in which a reciprocable motor is shifted between two end positions by a four-way control valve or a variant thereof. Conventionally, such systems have a three-way supply valve in the air line feeding the control valve, the supply valve being shiftable from time to time to its exhaust position in order to evacuate the system, and later shifted back to its supply position. This could result in sudden and dangerous shifting of the controlled part. For example, this part could be a press handling device which could drift by gravity to one position when line air is depleted and suddenly shifted back when full line pressure is applied.

2. Description of the Prior Art

It is known to place a piston-operated poppet safety valve between the supply and control valves, this safety valve being spring-urged to its closed position but having a restricted bypass from the supply valve to both the piston chamber and outlet ports of the safety valve. With this arrangement, full air pressure will be initially prevented from flowing from the supply to the control valve when the former is opened but will slowly build up in the safety valve piston chamber and simultaneously on one side of the reciprocable motor, slowly and safely shifting the motor to its opposite position. When the piston chamber pressure reaches a predetermined value, the safety valve will open, providing full supply pressure to the control valve.

In a known version of this safety valve, the restriction is in the form of a narrow hole drilled in the poppet valve member itself, with a restricted housing passage leading from the outlet port to the piston chamber.

This prior construction has disadvantages which it is an object of the present invention to overcome. It is necessary with the prior version to drill a separate hole in each poppet valve, and it has been found quite difficult to obtain satisfactory results in obtaining the right size of restriction, since extreme accuracy is required. Furthermore, it is impossible to vary the restriction size once the hole is drilled through the poppet valve member, such adjustability being often desirable.

BRIEF SUMMARY OF THE INVENTION

It is an object of the invention to provide a novel and improved safety valve construction for fluid systems of the type described, which is simple, economical, and convenient to construct.

It is a further object to provide an improved safety valve of this nature which permits easy adjustability of the speed of operation of the safety valve.

The invention comprises, in combination with a compressed air supply line for a reciprocable motor, said line having a supply valve for selectively pressurizing and exhausting said line and a control valve for said motor fed by said line through said supply valve, a safety valve intterposed between said supply and control valves, said safety valve having a housing, supply and outlet ports in said housing, a radial valve seat in said housing, a valve stem carrying a poppet valve member engageable with said seat, a spring urging said member against the seat, a piston carried by said stem and having a piston chamber opening to one face of said housing, said piston chamber being enclosed by a cover on said housing face, a first passage leading from said supply port to the portion of said piston chamber formed by said cover, a second passage leading from said portion of the piston chamber to said outlet port, and an adjustable restriction in said first passage, the relative dimensions of said piston and spring being such that said piston will shift said valve member against the urging of said spring to its open position when a predetermined proportion of said full line pressure has been reached.

In one embodiment of the invention, said adjustable restriction comprises a threaded portion in said first passage adjacent said housing face, and a plurality of externally threaded plugs alternately mountable in said threaded portion, said plugs having restricted passages of various minimum diameters.

In another version of the invention, the adjustable restriction comprises a needle valve rotatably mounted in said cover and disposed within a portion of said first passage, whereby rotation of said needle valve will adjust the restriction.

BRIEF DESCRIPTION OF THE DRAWINGS

FIG. 1 is a schematic view of a compressed air system for controlling a double-acting fluid motor which incorporates the safety valve of this invention;

FIG. 2 is an elevational view in cross section of an embodiment of the safety valve, in which the adjustable restriction comprises alternately usable plugs, one plug being shown;

FIG. 3 is a cross-sectional view in elevation of another plug for the embodiment of FIG. 2; and FIG. 4 is a cross-sectional view in elevation of a second embodiment of the invention in which the adjustable restriction is in the form of a needle valve.

DESCRIPTION OF THE PREFERRED EMBODIMENTS

FIG. 1 illustrates a typical system in which the safety valve of this invention may be used, the safety valve being generally indicated at 11. The valve is disposed in a compressed air supply line 12 between a supply valve 13 and a control valve 14. The control valve is for a double-acting reciprocable fluid motor 15 which operates a controlled part 16 such as a press handling device. As shown, supply valve 13 is a three-way valve movable between an exhaust position as shown, in which supply line 12 is connected to exhaust port 17, and a supply position in which a source 18 of compressed air is connected to supply line 12. Typically, valve 13 will be shifted to its open or supply position during the day, and to its exhaust position at night, to be reshifted to its supply position the next morning. Control valve 14 is shown as being a four-way valve in order to control the two lines 19 and 21 leading to the left and right hand sides respectively of motor 15. In its illustrated position, control valve 14 supplies pressure unrestricted through a one-way check valve 22 to the right hand side 23 of motor 15, shifting part 16 to the left. At the same time, air will leave the left hand side 24 of motor 15 through a restriction 25 to exhaust. When valve 14 is shifted, the opposite conditions will prevail; air will flow unrestricted through check valve 26 to chamber 24 of motor 15 and will leave chamber 23 through restriction 27 to exhaust. Control valve 14 will conventionally rest in one or the other of its positions, such as the position shown in FIG. 1, being shifted to its other position by means 28 such as a solenoid or pilot valve.

Without the presence of safety valve 11, when supply line 12 is shut down by moving valve 13 to its exhaust position, all pressurized air will leave the system including chambers 23 and 24. Even though motor 15 and part 16 might initially be left in their left hand positions as shown in FIG. 1, they could inadvertently drift or be shifted to their right hand position, for example by gravity. Control valve 14 would remain in the illustrated position which would otherwise have held motor 15 and part 16 in its left hand position by air pressure. Thus, when supply valve 13 is reopened, for example the next morning, full and immediate full air pressure supply to supply port 29 of control valve 14 might result in sudden and dangerous leftward shifting of part 16. Restriction 25 would be of no avail in preventing such sudden shifting because there would be no residual air pressure in chamber 24 when motor 15 starts its leftward movement.

Safety valve 11 is interposed in supply line 12 between valves 13 and 14. Referring to the first embodiment shown in FIGS. 2 and 3, the safety valve comprises a housing generally indicated at 31 having a supply port 32 at one end and an outlet port 33 at the other. A radial valve seat 34 is formed in housing 31 between these two ports. A valve stem 35 is slidably mounted in a bore 36 formed in the housing. The stem carries a poppet valve member 37 having a seal 38 engageable with seat 34. A helical coil compression spring 39 is disposed between valve member 37 and a member 41 carried by the housing, and urges seal 38 of member 37 against the valve seat.

A flat face 42 is formed on the side of housing 31 opposite member 41. The upper end of valve stem 35 carries a piston 43 having a seal 44 slidable in a piston chamber 45. This piston chamber opens toward face 42. A cover 46 is mounted on valve housing 31 and forms, with face 42, an enlarged portion 47 of the piston chamber.

A first passage 48 extends laterally from supply port 32 to face 42 and the piston chamber 47. A second passage 49 extends from face 42 to outlet port 33.

An adjustable restriction generally indicated at 51 is provided in first passage 48. In the embodiment of FIGS. 2 and 3, this adjustable restriction comprises a threaded portion 52 in passage 48 adjacent face 42, and a plurality of externally threaded plugs alternately mountable in threaded portion 52. Two such plugs, 53 and 54, are illustrated in FIGS. 2 and 3 respectively. Each plug has a restricted passage, that in plug 53 being indicated at 55 and that of plug 54 being shown at 56. Plugs with restricted passages of various sizes may be kept in inventory and the proper plug mounted in threaded portion 52 to suit requirements.

In operation, assume that the elements of this system are in an initial position as shown in FIG. 1, with supply valve 13 just having been moved to its exhaust position. Initially, motor 15 and part 16 may be in the left hand position shown in solid lines. However, let us further assume that these parts are inadvertently shifted in a right hand position shown in dot-dash lines. When valve 13 is shifted to its supply position, air will flow through supply port 32 but cannot pass through closed valve seat 34. Instead, it will flow at a controlled rate into piston chamber 45, 47 and through outlet port 33, control valve 14, line 21, and check valve 22 to right hand chamber 23 of motor 15. This will gradually shift motor 15 and part 16 to its left hand position. After the unit pressure within piston chamber 45, 47 has reached a predetermined value, say 35 to 40 psi in a 120 psi system, the force of spring 39 will be overcome and valve member 37 quickly shifted to its open position to provide full line pressure to the system. By this time, of course, part 16 will be safely in its left hand position.

Safety valve 11 will remain in its open position regardless of the movement of control valve 14. However, as soon as supply valve 13 is again shifted to its exhaust position, the pressure in piston chamber 45, 47 will be depleted and spring 39 will again close safety valve 11.

FIG. 4 illustrates a second embodiment of safety valve which is basically similar to the previous version and is generally indicated at 101. The valve has a housing generally indicated at 102, a supply port 103, an outlet port 104, a radial valve seat 105, a valve stem 106 carrying a valve member 107, and a spring 108 urging the valve member to its closed position. Stem 106 carries a piston 109 in a chamber 111 open toward housing face 112. Housing cover 113 forms, with face 112, an enlarged portion 114 of the piston chamber. A first passage generally indicated at 115 extends laterally from supply port 103 to face 112, a portion 116 of this first passage extending through a portion of cover 113. Another portion 117 of first passage 115 extends at right angles from portion 116 and opens into piston chamber portion 114.

The adjustable restriction is generally indicated at 118 and comprises a needle valve 119 threadably mounted at 121 in cover 113. Portion 122 of this needle valve is disposed within first passage portion 117. A slotted portion 123 at the opposite end of needle valve 119 is accessible from the side 124 of cover 113 to adjust the needle valve so as to achieve the desired operating characteristics. A pin 125 having a head 126 adjacent face 112 is mounted in the housing cover to prevent unauthorized access to the needle valve.

The operation of the embodiment of FIG. 4 will be similar to that described above with the respective FIGS. 2 and 3. An advantage of the version of FIG. 4 over that of FIGS. 2 and 3 is that it eliminates the need for storing a variety of restriction plugs.

I claim:

1. In combination with a reciprocable motor, a compressed air supply line for said reciprocable motor, said line having a supply valve for selectively pressurizing and exhausting said line and a control valve for said motor fed by said line through said supply valve, a safety valve interposed between said supply and control valves, said safety valve having a housing, supply and outlet ports in said housing, a radial valve seat in said housing, a valve stem carrying a poppet valve member engageable with said seat, said supply port being connected to said seat so as to urge said poppet valve member against the seat, a spring urging said member against the seat, a piston carried by said stem and movable in a piston chamber in said housing leading to one face of said housing, a portion of said piston chamber being formed by a cover mounted on said housing face, means separating the other side of said piston from said supply and outlet ports, a first passage in said housing leading from said supply port to the portion of said piston chamber formed by said cover, an unrestricted second passage in said housing leading from said portion of the piston chamber to said outlet port, and means for adjustably restricting said first passage, said means comprising a member manually movable with respect to said passage and accessible by an operator from the outside of said housing in the vicinity of said housing face and cover, said adjustable restriction member further comprising a needle valve rotatably mounted in said cover passing through said piston chambers portion and disposed within a portion of said first passage, whereby rotation of said needle valve will adjust restriction, the relative dimensions of said piston and spring being such that said piston will shift said valve member against the urging of said spring to its open position when a predetermined proportion of said full line pressure has been reached.

2. The combination according to claim 1, said first passage extending laterally from said supply port to said housing face with a portion extending through a portion of said cover, the portion of said first passage in which said needle valve is disposed extending laterally from said last-mentioned portion and opening into said piston chamber, said needle valve having a slotted portion accessible from the side of said cover.

3. The combination according to claim 2, the portion of said first passage extending though said cover being located on one side of said cover, said needle being rotatably mounted in the opposite side of said cover and extending across said piston chamber portion to said first passage.

4. The combination according to claim 3, said second passage being located adjacent said opposite side of the cover.

5. The combination according to claim 1, said cover being recessed to form said chamber portion.

* * * * *